United States Patent
Rönneke et al.

(10) Patent No.: US 12,245,323 B2
(45) Date of Patent: Mar. 4, 2025

(54) USER PLANE OPTIMIZATIONS FOR 5G CELLULAR INTERNET OF THINGS

(71) Applicant: Telefonaktiebolaget LM Ericsson (publ), Stockholm (SE)

(72) Inventors: Hans Bertil Rönneke, Kungsbacka (SE); Qian Chen, Mölndal (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 737 days.

(21) Appl. No.: 17/265,130

(22) PCT Filed: Jul. 29, 2019

(86) PCT No.: PCT/EP2019/070390
§ 371 (c)(1),
(2) Date: Feb. 1, 2021

(87) PCT Pub. No.: WO2020/025556
PCT Pub. Date: Feb. 6, 2020

(65) Prior Publication Data
US 2021/0315050 A1    Oct. 7, 2021

Related U.S. Application Data

(60) Provisional application No. 62/714,284, filed on Aug. 3, 2018.

(51) Int. Cl.
*H04W 76/38* (2018.01)
*H04W 76/27* (2018.01)

(52) U.S. Cl.
CPC .......... *H04W 76/38* (2018.02); *H04W 76/27* (2018.02)

(58) Field of Classification Search
CPC .............................. H04W 76/27; H04W 76/30
See application file for complete search history.

(56) References Cited

U.S. PATENT DOCUMENTS

2018/0324869 A1* 11/2018 Phuyal .............. H04W 74/0833
2019/0045572 A1*  2/2019 Kim ...................... H04W 76/34
(Continued)

FOREIGN PATENT DOCUMENTS

| WO | 2017196146 A1 | 11/2017 |
| WO | 2018057120 A1 | 3/2018 |
| WO | 2019032222 A1 | 2/2019 |

OTHER PUBLICATIONS

International Search Report and Written Opinion of the International Searching Authority for PCT International Application No. PCT/EP2019/070390 dated Oct. 29, 2019.
(Continued)

*Primary Examiner* — Zhiren Qin
(74) *Attorney, Agent, or Firm* — Sage Patent Group

(57) ABSTRACT

Disclosed herein is a method of operating a RAN node of a wireless communication network, the method comprising: receiving a connection resume request message from a wireless terminal at the RAN node instructing the RAN node to establish a connection with the wireless terminal; providing release information for the wireless terminal at the RAN node; receiving uplink data from the wireless terminal at the RAN node, wherein the uplink data is associated with the connection resume request message; and transmitting a connection release message to the wireless terminal after receiving the uplink data responsive to the release information for the wireless terminal, wherein the connection release message instructs the wireless terminal to release and/or suspend the connection.

23 Claims, 9 Drawing Sheets

RRC Inactivation with MO transmission

(56) References Cited

U.S. PATENT DOCUMENTS

| | | | |
|---|---|---|---|
| 2019/0059067 A1* | 2/2019 | Lee | H04L 67/141 |
| 2019/0104564 A1* | 4/2019 | Johansson | H04W 88/023 |
| 2019/0141515 A1* | 5/2019 | Kim | H04W 52/0219 |
| 2019/0159132 A1* | 5/2019 | Abraham | H04W 76/27 |
| 2019/0166553 A1 | 5/2019 | Ryoo et al. | |
| 2020/0037345 A1* | 1/2020 | Ryoo | H04W 74/0833 |
| 2020/0068547 A1* | 2/2020 | Li | H04W 8/24 |
| 2020/0100088 A1* | 3/2020 | Kim | H04W 48/16 |
| 2020/0351723 A1* | 11/2020 | Kim | H04W 36/0033 |
| 2020/0374927 A1* | 11/2020 | Yu | H04W 74/002 |
| 2020/0383164 A1* | 12/2020 | Kim | H04W 76/12 |
| 2021/0120463 A1* | 4/2021 | Kim | H04W 36/0088 |

OTHER PUBLICATIONS

3GPP TR 23.724 V0.5.0, "3rd Generation Partnership Project; Technical Specification Group Services and System Aspects; Study on Cellular IoT support and evolution for the 5G System (Release 16)," Technical Report, Jul. 2018, 220 pages.

3GPP TS 23.501 V15.2.0, "3rd Generation Partnership Project; Technical Specification Group Services and System Aspects; System Architecture for the 5G System; Stage 2 (Release 15)," Technical Specification, Jun. 2018, 217 pages.

3GPP TS 23.502 V15.2.0, "3rd Generation Partnership Project; Technical Specification Group Services and System Aspects; Procedures for the 5G System; Stage 2 (Release 15)," Technical Specification, Jun. 2018, 308 pages.

Office Action mailed Oct. 16, 2023 for Chinese Patent Application No. 201980050106.3, 9 pages.

R2-1810111; 3GPP TSG-RAN WG2 Meeting NR Adhoc 1807; Montreal, Canada; Jul. 2-6, 2018; Nokia, Nokia Bell; "RRC connection release initiation by the network"; Draft Change Request; 38.331 v15.1.0; 2 pages.

S2-1811231; SA WG2 Meeting #129; Dongguan, P.R. China; Oct. 15-19, 2018; Ericsson; "K12 UE power efficiency resolved"; SA WG2 Temporary Document; 19 pages.

S2-1811947; SA WG2 Meeting #129-Bis; West Palm Beach, Florida, US; Nov. 26-30, 2018; Ericsson; "K12 Pending DL data at AS RAI"; SA WG2 Temporary Document; 16 pages.

* cited by examiner

MO data Transmission

Single MO data Transmission with EDT

RRC Inactivation with MO transmission

RRC Inactivation with MO and early data transmission

Mobile Originated Data Transport via NAS-SM

USER PLANE OPTIMIZATIONS FOR 5G CELLULAR INTERNET OF THINGS

CROSS REFERENCE TO RELATED APPLICATIONS

This application is a 35 U.S.C. § 371 national stage application of PCT International Application No. PCT/EP2019/070390 filed on Jul. 29, 2019, which claims the benefit of U.S. Provisional Patent Application Ser. No. 62/714,284, filed on Aug. 3, 2018, the disclosures and content of which are incorporated by reference herein in their entireties.

TECHNICAL FIELD

The present disclosure relates generally to communications, and more particularly, to wireless communications and related wireless devices and network nodes.

BACKGROUND

The 5th Generation 5G Cellular Internet of Things CIoT study in 3GPP SA2 (see, TR 23.724 V0.5.0, Reference [1]) is progressing a few User Plane (UP) changes/improvements/optimizations for 5G CIoT. A few of these may use a wireless device UE context in the NG-RAN, e.g., solution 19 (5G UP Optimization) and solution 7 (Small data frequent communication). At release of the Radio Resource Control RRC Connection, such solutions may not discard the UE context but may keep the Access Stratum AS context in the RAN and the UE. For solutions that do not keep any UE context in NG-RAN, e.g. "normal" CM-IDLE, the UE context is only kept in the Access and Mobility Function AMF (and UE).

Many CIoT devices may be power limited in that they may have limited/no access to an outside power source, and such devices may rely on a battery for power without recharging for long periods of time. Accordingly, maintaining the transmitter and/or receiver on when communication is not occurring may reduce battery life.

SUMMARY

It is desirable for a CIoT device or similar UE that have sent a single or a few UL packet (unacknowledged or acknowledged by DL packet(s)) that its radio transmitter can be switched off as quickly as possible. This will increase the battery lifetime for battery operated devices significantly. Thus, one problem is how to determine when the radio transmitter of a CIoT device or similar UE can be switched off.

To solve or mitigate this problem a method is disclosed herein of operating a radio access network, RAN, node of a wireless communication network, the method comprising: receiving a connection resume request message from a wireless terminal at the RAN node instructing the RAN node to establish a connection with the wireless terminal; providing release information for the wireless terminal at the RAN node; receiving uplink data from the wireless terminal at the RAN node, wherein the uplink data is associated with the connection resume request message; and transmitting a connection release message to the wireless terminal after receiving the uplink data responsive to the release information for the wireless terminal, wherein the connection release message instructs the wireless terminal to release and/or suspend the connection.

Similarly, a RAN node is disclosed herein, wherein the RAN node is adapted to: receive a connection resume request message from a wireless terminal at the RAN node instructing the RAN node to establish a connection with the wireless terminal; provide release information for the wireless terminal at the RAN node; receive uplink data from the wireless terminal at the RAN node, wherein the uplink data is associated with the connection resume request message; and transmit a connection release message to the wireless terminal after receiving the uplink data responsive to the release information for the wireless terminal, wherein the connection release message instructs the wireless terminal to release and/or suspend the connection.

Further embodiments will be discussed in the following.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 7:
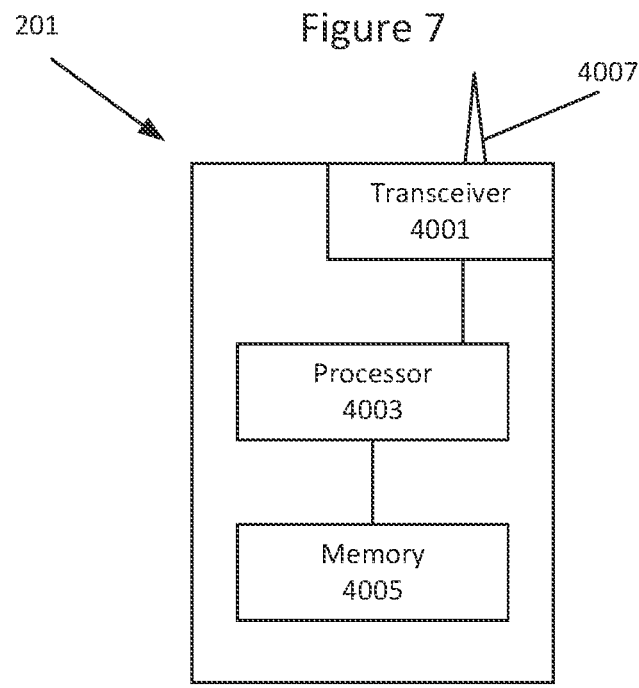
FIG. 7 is a block diagram illustrating a wireless device UE according to some embodiments of inventive concepts.

FIG. 7 is a block diagram illustrating elements of a wireless device UE 201 (also referred to as a wireless terminal, a wireless communication device, a wireless communication terminal, user equipment, UE, a user equipment node/terminal/device, etc.) configured to provide wireless communication according to embodiments of inventive concepts. As shown, wireless device UE may include an antenna 4007, and a transceiver circuit 4001 (also referred to as a transceiver) including a transmitter and a receiver configured to provide uplink and downlink radio communications with a radio access network RAN node (e.g., a base station, eNB, gNB, etc.) of a wireless communication network. Wireless device UE 201 may also include a processor circuit 4003 (also referred to as a processor) coupled to the transceiver circuit, and a memory circuit 4005 (also referred to as memory) coupled to the processor circuit. The memory circuit 4005 may include computer readable program code that when executed by the processor circuit 4003 causes the processor circuit to perform operations according to embodiments disclosed herein. According to other embodiments, processor circuit 4003 may be defined to include memory so that a separate memory circuit is not required. Wireless device UE may also include an interface (such as a user interface) coupled with processor 4003, and/or wireless device UE may be an IoT and/or MTC device.

As discussed herein, operations of wireless device UE 201 may be performed by processor 4003 and/or transceiver 4001. For example, processor 4003 may control transceiver 4001 to transmit uplink communications through transceiver 4001 over a radio interface to a RAN node of a wireless communication network and/or to receive downlink communications through transceiver 4001 from a RAN node of the wireless communication network over a radio interface. Moreover, modules may be stored in memory 4005, and these modules may provide instructions so that when instructions of a module are executed by processor 4003, processor 4003 performs respective operations (e.g., operations discussed below with respect to Example Embodiments).

Figure 8:
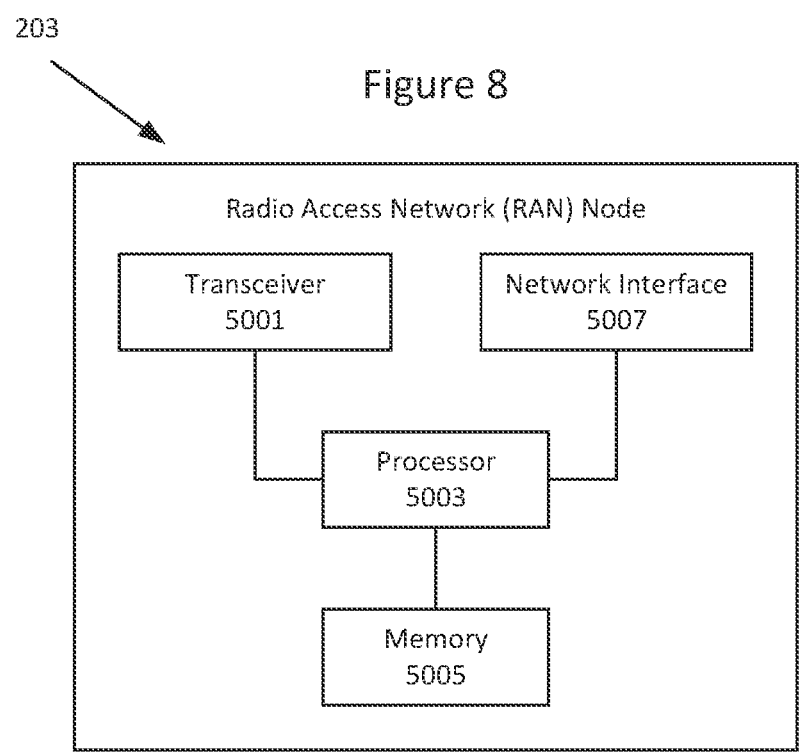
FIG. 8 is a block diagram illustrating a radio access network RAN node according to some embodiments of inventive concepts.

FIG. 8 is a block diagram illustrating elements of a radio access network RAN node 203 (also referred to as a network node, base station, eNB, eNodeB, gNB, gNodeB, etc.) of a wireless communication network configured to provide cellular communication according to embodiments of inventive concepts. As shown, RAN node 203 may include a transceiver circuit 5001 (also referred to as a transceiver) including a transmitter and a receiver configured to provide uplink and downlink radio communications with wireless devices. The RAN node 203 may include a network interface circuit 5007 (also referred to as a network interface) configured to provide communications with other nodes (e.g., with other base stations and/or core network nodes) of the wireless communication network. The RAN node 203 may also include a processor circuit 5003 (also referred to as a processor) coupled to the transceiver circuit, and a memory circuit 5005 (also referred to as memory) coupled to the processor circuit. The memory circuit 5005 may include computer readable program code that when executed by the processor circuit 5003 causes the processor circuit to perform operations according to embodiments disclosed herein. According to other embodiments, processor circuit 5003 may be defined to include memory so that a separate memory circuit is not required.

As discussed herein, operations of the RAN node 203 may be performed by processor 5003, network interface 5007, and/or transceiver 5001. For example, processor 5003 may control transceiver 5001 to transmit downlink communications through transceiver 5001 over a radio interface to one or more UEs and/or to receive uplink communications through transceiver 5001 from one or more UEs over a radio interface. Similarly, processor 5003 may control network interface 5007 to transmit communications through network interface 5007 to one or more other network nodes and/or to receive communications through network interface from one or more other network nodes. Moreover, modules may be stored in memory 5005, and these modules may provide instructions so that when instructions of a module are executed by processor 5003, processor 5003 performs respective operations (e.g., operations discussed below with respect to Example Embodiments). In addition, a structure similar to that of FIG. 8 may be used to implement other network nodes (e.g., AMF, SMF, UPF, AF, and/or NEF nodes), for example, omitting transceiver 5001. Moreover, network nodes discussed herein may be implemented as virtual network nodes.

It may be desirable for CIoT devices that have sent a single uplink UL packet (unacknowledged or acknowledged with/by one downlink DL packet) that the radio transmitter/receiver can be switched off as quickly as possible. This may significantly increase the battery lifetime for battery operated devices.

Determining exactly when the radio transmitter can be switched off, however, may be difficult. For example, if the first UL packet triggers additional DL (and UL) packets between the application in the AS and the UE, it may be desirable to leave the transmitter on.

Figure 1:
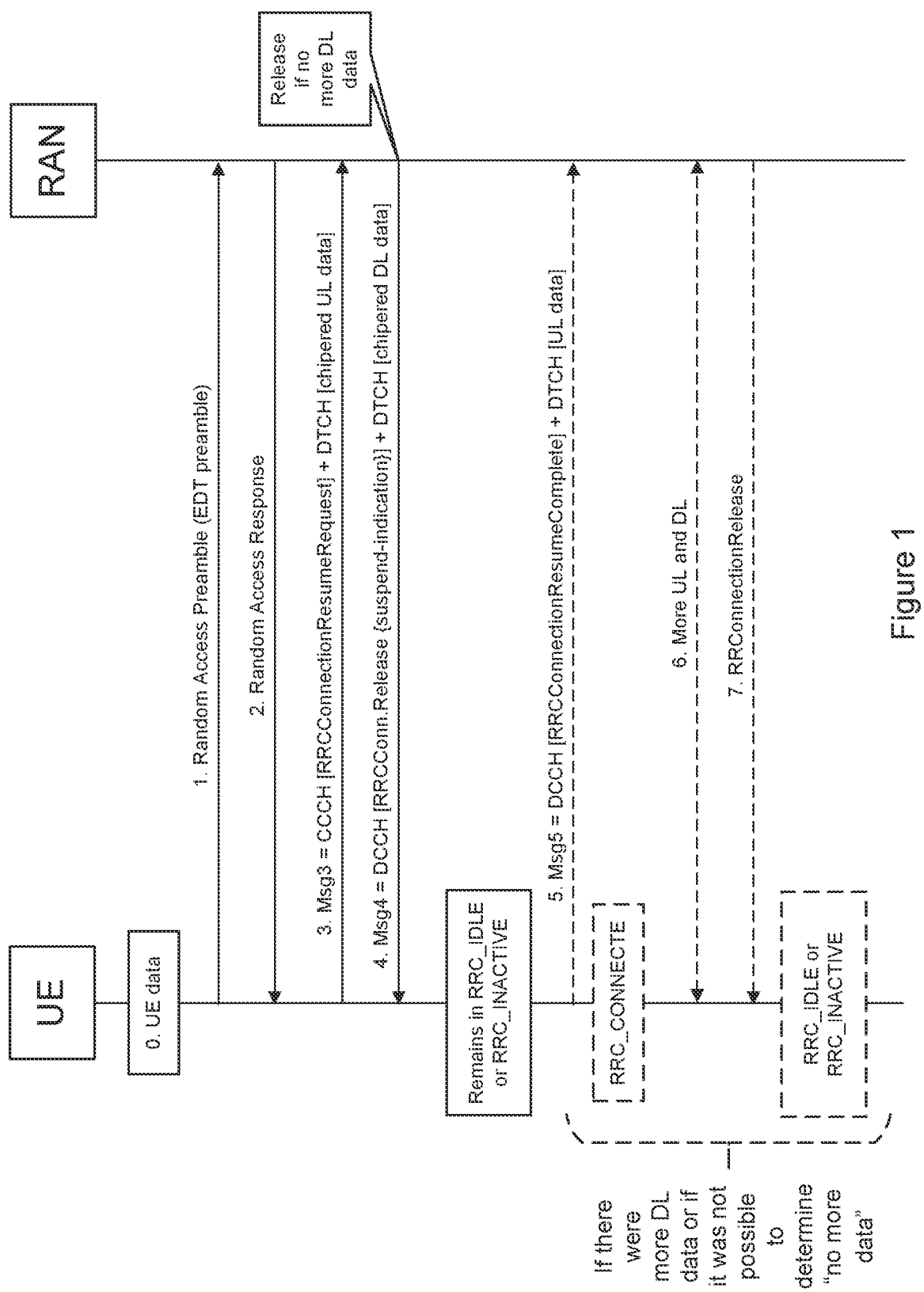
FIG. 1 is a message diagram illustrating operations of early data transfer in a wireless communication network.

To illustrate gains that may be achieved if it is possible to determine when to turn the UE transmitter off, FIG. 1 illustrates an example of Early Data Transmission EDT for which UE power consumption may be reduced. EDT in general has been standardized for Evolved Packet Core EPC, but so far not described for 5G CIoT more than in TR 23.724 Solution 7 (clause 6.7) which is an example of CM-CONNECTED w/RRC_INACTIVE. However, an improved/optimized release/suspend of the RRC_CONNECTION for "single packet" or "dual packet" may provide improved performance.

FIG. 1 is a message diagram illustrating an example with Early Data Transmission EDT. If the Radio Resource Control RRC Connection Establishment can be aborted after the Msg3 RRC Connection Resume Request by sending a RRC Connection Release with suspend-indication, then the UE radio can immediately go back to RRC_IDLE or RRC_INACTIVE, both being much more energy efficient, without having to transition to RRC_CONNECTED state or without having to wait for an Inactivity Timer to expire (typically several seconds) before it can transition go back to RRC_IDLE or RRC_INACTIVE. A same/similar issue may apply to a CM-IDLE mode.

In order to decide whether to immediately suspend/release the connection, the RAN (or core network CN in the CM-IDLE case) may need to determine if there will be more DL data (or UL data) or not.

According to some embodiments of inventive concepts, methods may be provided to immediately suspend or release an RRC Connection after single UL packet transmission or dual (UL+DL) packet transmission based on information available in the network. This may significantly reduce UE power consumption which may be important for battery operated devices. The information in the network to support immediate RRC suspend or release can be referred to as Traffic Pattern, Traffic Profile, Release Assistance Information, Release Assistance Indicator, etc. The information can be provided by the owner of the application server AS and/or by the wireless device UE (e.g., entities that know the behavior of the application) to reduce battery power consumption at the wireless device. The operator can configure the information in the unified data management UDM subscription data, which is provided to the access and mobility function AMF at wireless device UE Registration in the network, and provided to the NG-RAN at the very first communication (i.e., the first time the RRC state is RRC-CONNECTED). The AS owner can also use a solution to the Network Parameter Configuration application programming interface API via network exposure function NEF key issue 10 in 5GS (see TR 23.724 clause 5.10) to configure the above parameters into the UDM and AMF UE context.

Some embodiments may use an optional Traffic Pattern/Traffic Profile/Release Assistance Information/Release Assistance Indicator present/stored in the UE context in the RAN at the reception of the RRC Connection Resume Request.

According to some other embodiments (see discussion below with respect to FIG. 6), if there is no such info (TP/RAI) stored in the radio access node RAN (e.g., in the CM-IDLE case), some embodiments may use a TP/RAI information in the AMF or SMF to immediately release or suspend a CM-CONNECTED UE from AMF after a single UL packet transmission or dual (UL+DL) packet transmission based on TP/RAI information available in the AMF or SMF. CN AMF may then decide to immediately release N2 connection if CM-IDLE mode is desired, or provide info to RAN to suspend the RRC connection if RRC inactive mode is desired.

Some embodiments may also have a logic to use the UE provided Release Assistance Indication (RAI) by which the UE or the application in the UE may optionally indicate if a particular transmission is a single packet, or dual packet (UL+DL), or multiple packet transmission. Aspects of RAI may be discussed in TR 23.724 e.g. solution 1 in 6.1 (CP-data). In solution 19 (5G UP Optimization) in 6.19.4.2 RAI is mentioned in step 2, but use of RAI for immediate RRC suspension as disclosed herein is not discussed.

According to some embodiments discussed below, Early Data Transmission (EDT) may be used together with a 5G user plane UP Optimization (e.g., TR 23.724 solution 19 clause 6.19). EDT is discussed with solution 7 which is CM-CONNECTED w/RRC_INACTIVE, but EDT has not been described with CM-IDLE w/ suspend/resume (aka solution 19 "5G UP Optimization"). See discussion provided below with respect to FIG. 3. The immediate RRC suspend is part of this EDT procedure.

Note that EDT is an improvement/optimization where a single UL packet (and optionally also a subsequent single DL packet) can be passed as part of the RRC Connection establishment procedure messages instead of using separate messages over the radio. In EDT, data is "piggy backed" on the RRC connection establishment messages instead of using separate/extra messages.

According to some embodiments disclosed herein, wireless device UE power consumption in a 5G system may be reduced at UL single packet transmission (a common use case for 5G CIoT) when RRC Inactive is used, when CM-IDLE is used, and/or when the 5G UP Optimization (aka CM-IDLE w/ suspend/resume) is used. According to some embodiments, wireless device UE power consumption may be reduced/minimized at dual packet transmission (one UL packet followed by one DL packet). Such reductions in power consumption may be significant for battery operated 5G CIoT wireless devices where the target battery lifetime may be 10 years or more.

The application of EDT to the 5G UP Optimization (see discussion below with respect to FIG. 3) may provide substantial reduction in signalling over the radio for single and/or dual packet transmissions for 5G CIoT.

Figure 2:
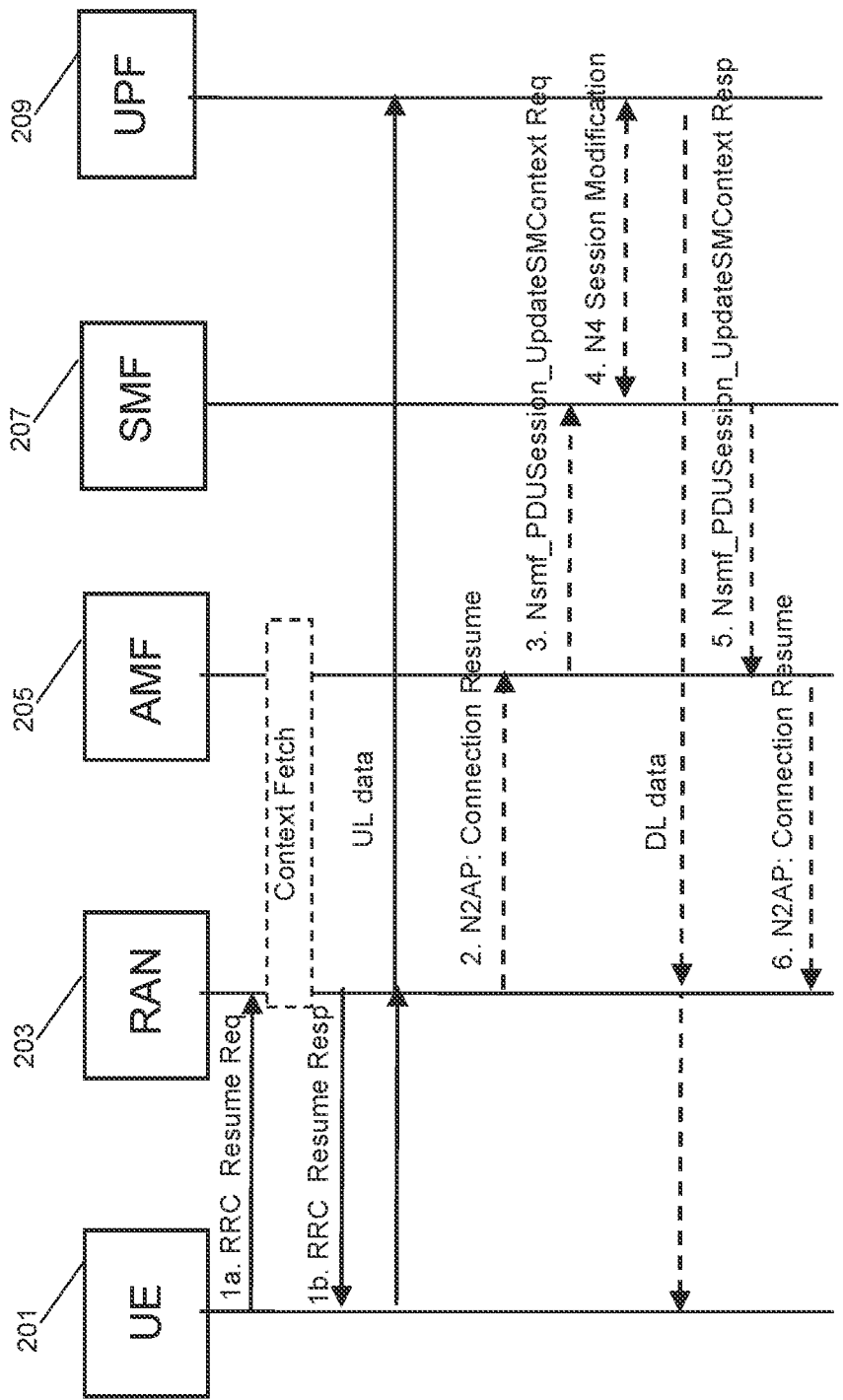
FIG. 2 is a message diagram illustrating operations for uplink data according to some embodiments of inventive concepts.

Uplink data transmission from CM-IDLE w/ suspend/resume is discussed with respect to FIG. 2.

FIG. 2 is a message diagram illustrating mobile originated MO data Transmission using a 5GS user plane UP for infrequent and/or frequent small data transmission. Operations of FIG. 2 may be used to support delivery of a small data packet in an uplink UL from a wireless terminal UE to a wireless communication network.

Operations of FIG. 2 may be provided as part of a random access procedure. While not shown in FIG. 2, wireless device UE 201 may initiate the random access procedure by transmitting a random access preamble message (msg1) of the random access procedure to radio access network RAN node 203, and RAN node 203 may respond by transmitting a random access response message (msg2) of the random access procedure to wireless device UE 201. As used herein, RAN node 203 may also be referred to as NG-RAN or NG-RAN node.

Operation 1a.

Wireless device UE 201, preferably after having left Idle mode or Idle state or similar (but not necessarily having entered a fully connected state), transmits an RRC Connection Resume Request message including a Resume ID which identifies the AS context for UE 201 stored in the NG-RAN. Using the valid AS Context for the UE, the NG-RAN performs AS security check, a data radio bearer DRB is established, and NG-RAN enables N3 UL TEID for data delivery. The RRC connection resume request message may be transmitted as a msg3 of the random access procedure. An Access Stratum (AS) Release Assistance Indication (RAI) may be included by the UE 201 in the RRC Connection Resume Request indicating single packet transmission.

If the Resume ID indicates another NG-RAN within Xn connectivity, i.e., old NG-RAN, the NG-RAN performs direct context fetch via Xn.

Note that for the case that the old NG-RAN is not within Xn connectivity, RAN3 WG may need to study whether indirect context fetch via AMF or another network function is to be defined.

If NG-RAN fails to get valid AS context, RAN node 203 may reject RRC Connection Resume with an appropriate cause, so that the UE performs the related NAS procedure.

Operation 1b.

RAN node 203 may transmit an RRC connection resume response message to wireless device 201. The RRC Connection will transition to RRC_CONNECTED state.

Operation 1c.

UE can send UL data right after the successful RRC Connection Resume procedure (i.e., responsive to receiving the RRC connection resume response message). The NG-RAN 203 forwards the UL data received from the UE 201 to the user plane function UPF node 209 by using N3 UL TEID in the AS context.

Operation 1d.

If NG-RAN expect no DL data, e.g. based on UE provided AS RAI indicating single packet or based on the Expected UE Behavior (with Release Assistance Information/Traffic Pattern/Traffic Profile available in the UE context in NG-RAN) indicating single packet (and the AS RAI which may have precedence is not present), this procedure may stop here and NG-RAN 203 immediately suspends the RRC connection by transmitting an RRC connection release message with a suspend indication.

In the event that no downlink data is expected as the RRC connection release message is transmitted at operation 1d, operations 2-6 may be omitted (as indicated by dashed lines) to more quickly release wireless device 201 so that battery usage at wireless device 201 may be reduced.

Operation 2.

If NG-RAN 203 expects DL data or is unaware if DL data will follow, NG-RAN 203 notifies the AMF that UE 201 connection has been resumed by sending N2AP message which includes N2 SM info and protocol data unit PDU Session identifier ID. The NG-RAN 203 includes N3 DL TEID for the PDU session in the N2 SM message.

Operation 3.

AMF node 205 enters CM-Connected state. The AMF node 205 identifies the UE context, and forwards N2 SM message to the session management function SMF node 207.

Operation 4.

The SMF node 207 identifies the UE and the PDU session. If there is an N2 SM message in the Nsmf_PDUSession_UpdateSMcontext request message, the SMF node 207 performs N4 Session Modification to update N3 DL TEID to the UPF node 209.

If downlink DL data has arrived for the UE 201, the UPF node 209 forwards the data to the NG-RAN 203 using N3 DL TEID.

Operation 5.

The SMF sends Nsmf_PDUSession_UpdateSMcontext response. If there is any change for the PDU session e.g., in case of the QoS targets cannot be fulfilled for a QFI, the SMF informs this information in the N2 SM information.

Operation 6.

The AMF node 205 acknowledges the connection resume to the NG-RAN node 203. If there is change of PDU session as received in N2 SM message from the SMF node 207, NG-RAN node 203 can perform RRC reconfiguration. If available, the AMF node 205 shall also provide the indication of single or dual packet information to NG-RAN node 203 (e.g. by including the Expected UE Behavior) in case the NG-RAN node 203 does not already have this information, and AMF node 205 considers NG-RAN node 203 to be responsible for the connection release (either enter RRC inactive, or Suspend, or CM-IDLE state). In case of single or dual packet transmission, the NG-RAN node 203 can immediately suspend the RRC connection by transmitting an RRC connection release message with a suspend indication to the UE, after having received the N2AP Connection Resume message and when DL data packet transmission has taken place. Normally the NG-RAN waits for an inactivity timer to expire before it suspends the RRC connection.

Figure 3:
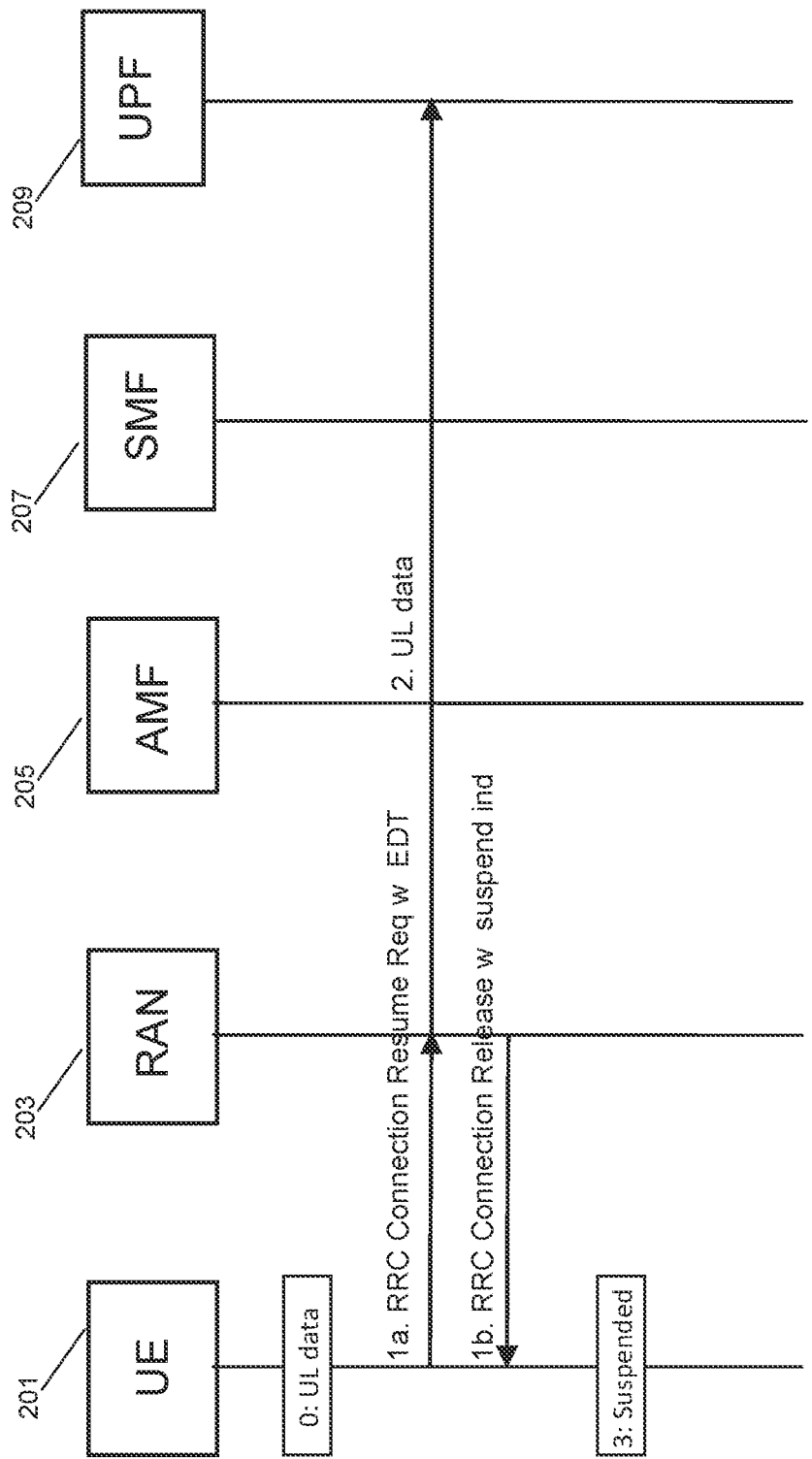
FIG. 3 is a message diagram illustrating operations for uplink data according to some embodiments of inventive concepts.

UL data transmission from CM-IDLE w/suspend/resume (solution 19) with Early Data Transmission EDT is discussed below with respect to FIG. 3. FIG. 3 is a message diagram illustrating an example of how a single MO small data packet may be delivered from the UE 201 using Early Data Transmission using 5GS user plane UP with EDT.

Operations of FIG. 3 may be provided as part of a random access procedure. While not shown in FIG. 3, wireless device UE 201 may initiate the random access procedure by transmitting a random access preamble message (msg1) of the random access procedure to radio access network RAN node 203, and RAN node 203 may respond by transmitting a random access response message (msg2) of the random access procedure to wireless device UE 201. As used herein, RAN node 203 may also be referred to as NG-RAN.

Operation 1a.

In response to the random access response, the UE 201, preferably after having left Idle mode or Idle state or similar (but not necessarily having entered a fully connected state) may send (i.e., transmit) an RRC Connection Resume Request message with the uplink UL data included as Early Data Transmission EDT with the RRC Connection Resume Request, for example, as a Msg3 with CCCH [RRCConnectionResumeRequest]+DTCH [ciphered UL data]. The Resume ID which identifies the AS context stored in the NG-RAN is included. Using the valid AS Context for the UE, the NG-RAN enables N3 UL TEID for data delivery.

Operation 1b.

Either based on the Access Stratum (AS) Release Assistance Indication (RAI) included by the UE 201 in the RRC Connection Resume Request of operation 1 a indicating single packet transmission, or if the Expected UE Behavior is available and stored in the UE context in RAN (e.g., with Traffic Pattern/Traffic Profile/Release Assistance Information parameter present) indicating single packet and the AS RAI (which may have precedence) is not present in operation 1 a, or if NWDAF (Network Data Analytics Function) data per TS 23.501 is available for the UE in RAN 203 indicating single packet and the AS RAI (which may have precedence) is not present in operation 1 a, or if NG-RAN 203 can determine based on other information locally available in the NG-RAN 203, in the AS Context for the UE 201 stored in the NG-RAN 203, or from information retrieved from the AMF node 205, then NG RAN 203, for increased/maximum UE power efficiency, may immediately release the RRC connection by transmitting an RRC Connection Release message with a suspend indication (and without any EDT DL data). That is, the request to resume the RRC connection is rejected/not progressed and the RRC connection will remain suspended.

Operation 2.

The NG-RAN 203 forwards the UL data received from the UE 201 to the UPF node 209 by using N3 UL TEID in the AS context.

Operation 3. UE Remains Suspended.

Figure 4:
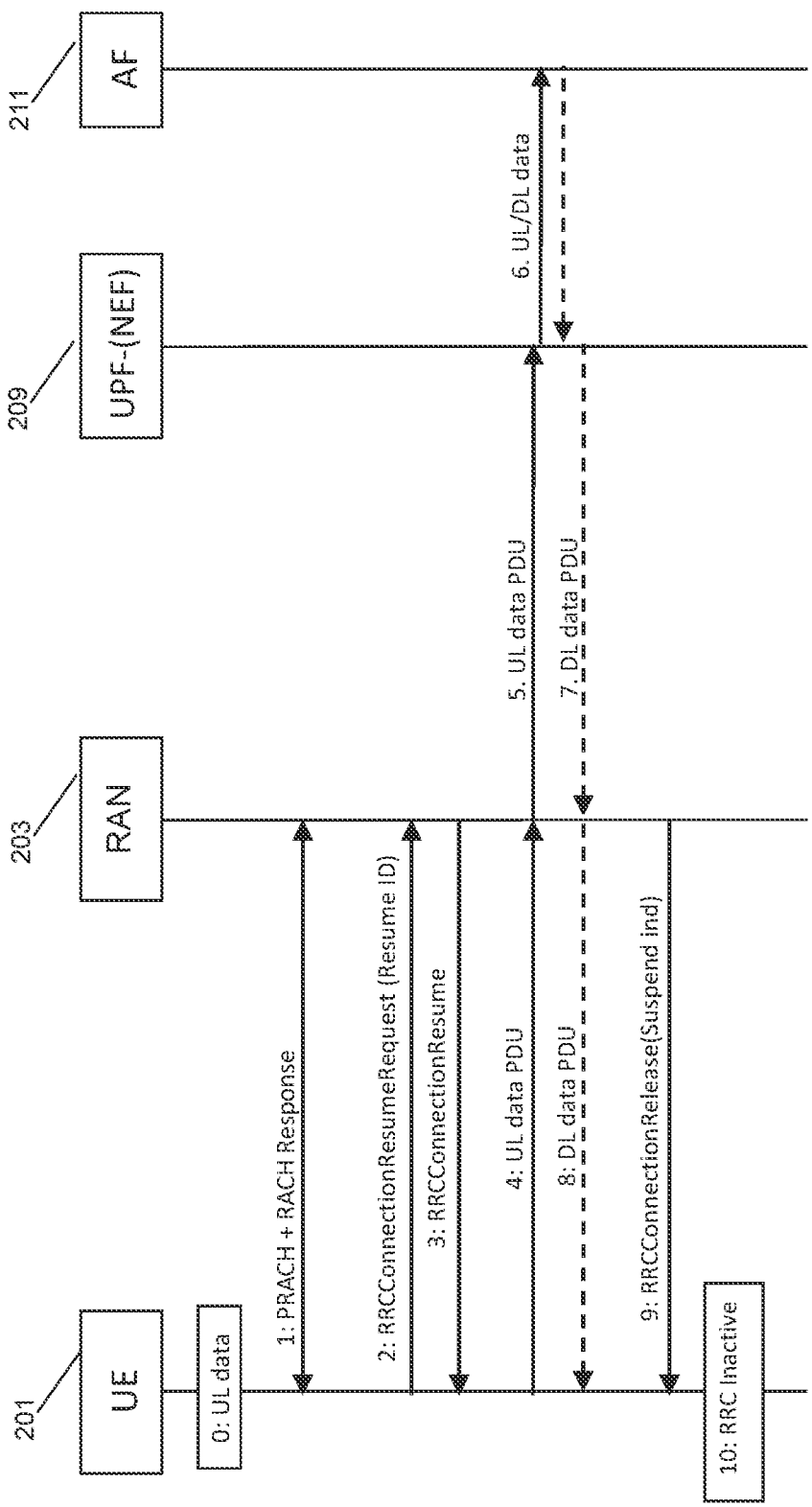
FIG. 4 is a message diagram illustrating operations for uplink and downlink data according to some embodiments of inventive concepts.

Embodiments supporting frequent (and infrequent) communication of small data are illustrated in FIGS. 4 and/or 5. Embodiments of FIGS. 4 and/or 5 may allow the UE 201 used for frequent small data communication to use the eDRX (extended Discontinuous Reception) power saving method as investigated in KI #4. This may allow UE power efficiency for traffic patterns for frequent small data communication with gaps between transmissions.

Embodiments of FIGS. 4 and/or 5 may use combinations of RRC Inactive, EDT, power saving methods, and/or HLCOM (High latency communication) to meet architecture goals/requirements on both resource-efficiency and UE power efficiency.

According to some embodiments for frequent and infrequent small data communication, the following operations/functions may be supported:

Small data may be transmitted with reduced signalling using the RRC Inactive state. For single and dual packet transmissions (UL+DL), even further reduction of signalling over the radio may be achieved using the Early Data Transmission (subject to RAN decision).

Fast release of the RRC connection at single and dual packet transmissions may be supported, thereby increasing/maximizing the UE power efficiency.

Delivery of IP data and Unstructured (NIDD) data may be supported.

MT data transmission to power saving devices (KI 4 functions, e.g., eDRX) using extended buffering and UE reachability event notifications (KI 3 functions) may be supported.

The existing UP security mechanisms in 5G systems may be supported.

Charging, roaming, and/or policy control may be supported. Further 5G CIoT support for charging of messages may be supported.

EPC-5GC interworking may be supported according to some embodiments of FIGS. 4 and/or 5.

Mobile Originated MO transmissions for frequent small data communication may use RRC Inactive and Early Data Transmission to reduce the signalling. RRC Inactive with MO transmission may save a UE context in the RAN at an initial small data transmission. All subsequent MO small data transmissions can then benefit from MO UL and DL transmission of small data without significant/any 5G CP signalling. The RAN node 203 may simply forward any UL data on the existing N3 interface. And any subsequent DL data and additional UL data can be forwarded in the same improved/optimized way. Note that unlike CP-data in the EPS, there may be no limit or break even for how much subsequent DL&UL data can be forwarded during a single RRC connection with this solution before there is a signalling penalty (i.e., before the improvement/optimization becomes less advantageous compared to sending the small data without any improvement/optimization at all).

Early Data Transmission with RRC Inactive and MO transmission may make even further signalling improvement/optimization over the radio by piggy backing the first UL data and/or the first DL data to the RRC connection establishment signalling (i.e. RRC Connection Resume Request or RRC Connection Request). This may save an additional one or potentially two messages over the radio.

According to some embodiments supporting mobile originated MO transmission with RRC inactive, an improved/optimized data transmission for small data may be provided using the RRC Inactive state for the UE connected to the 5GS. RRC Inactive is supported in 5GS from Rel-15 when NG-RAN is used. Such embodiments may use RRC Inactive also when NB-IoT and LTE-M are used. The RRC_INACTIVE feature may be used to transmit small data without necessarily performing a full state transition to RRC_CONNECTED i.e. Early Data Transmission (see TR 38.804 [15], Annex G). Note that RRC Inactive for NB-IoT & LTE-M connected to 5GC is work in progress in RAN and coordination with RAN may be needed.

FIG. 4 is a message diagram illustrating RRC Inactive with MO transmission. The UPF-(NEF) entity 209 (also referred to as a UPF-(NEF) node) in FIG. 4 is the UPF-NEF (i.e., Small data delivery function) in the Indirect Model case (i.e., when NIDD API is used) and it is a UPF in the Direct Model case.

Operation 1.

Operations of FIG. 4 may be provided as part of a random access procedure. While not shown separately in FIG. 4, wireless device UE 201, preferably leaving Idle mode or Idle state or similar (but not necessarily entering a fully connected state), may initiate the random access procedure by transmitting a random access preamble message (msg1 or PRACH) of the random access procedure to radio access network RAN node 203, and RAN node 203 may respond by transmitting a random access response message (msg2 or RACH Response) of the random access procedure to wireless device UE 201, as indicated at Operation 1. As used herein, RAN node 203 may also be referred to as NG-RAN.

Operation 2.

In response to the random access response, the UE 201, preferably after having left Idle mode or Idle state or similar, may send (i.e., transmit) an RRC Connection Resume Request message with the Resume ID which identifies the AS context stored in the NG-RAN.

Operation 3.

RAN node 203 may transmit an RRC connection resume message to wireless device 201. Upon completion of Operations 1-3, the RRC connection may be moved from inactive to active.

Operation 4.

Wireless device UE 201 sends/transmits an uplink UL protocol data unit PDU with small data to RAN node 203.

If an AS RAI (included by the UE 201 in the RRC Connection Resume Request of operation 2) indicated single packet transmission, or if the Expected UE Behaviour stored in the UE context in RAN 203 indicates single packet transmission and the AS RAI is not present, then RAN node 203 may continue to operation 9 (skipping operations 7 and 8) and immediately release the RRC connection to inactive state without waiting for any RAN specific timeout after receiving the UL PDU of operation 4. In this situation, operations 5 and 6 may be performed before or after releasing the RRC connection.

If AS RAI indicated dual packets, or if the Expected UE Behaviour stored in the UE context in RAN indicates dual packets and the AS RAI was not present, then RAN may continue to operations 5, 6, 7 and 8 before releasing the RRC connection to inactive state.

Operation 5.

RAN node 203 forwards the UL data PDU to UPF-(NEF) node 209.

Operation 6.

UPF-(NEF) node 209 may forward the UL data PDU to Application Function AF node 211. For the Direct Model case, the UPF node 209 may forward data to the AF node 211 (i.e. SCS/AS). For the Indirect Model case, operation 6 may be the NIDD API. See for example the UPF-NEF solution 35.

Operation 7.

For the Direct Model case the UPF node 209 may receive data from the AF node 211 (i.e. SCS/AS). For the Indirect Model case this operation may be the NIDD API. See for example the UPF-NEF solution 35. UPF node 209 may forward the DL data PDU (e.g., an acknowledgement) to RAN node 203.

Operation 8.

RAN node 203 may forward/transmit the DL Data PDU (e.g., the acknowledgement) to wireless device UE 201.

Operation 9.

RAN node 203 may release the RRC connection without waiting for any RAN specific timeout. For a single packet transmission (omitting operations 7 and 8), RAN Node 203 may release the RRC connection by transmitting the RRC Connection Release message (with a suspend indication) immediately after receiving the uplink PDU of operation 4 without waiting for any RAN specific timeout. For a dual packet transmission, RAN node 203 may release the RRC connection by transmitting the RRC Connection Release message (with suspend indication) immediately after transmitting the downlink PDU of operation 8 without waiting for any RAN specific timeout.

Operation 10.

Wireless device UE 201 enters RRC inactive mode responsive to receiving the RRC Connection Release message of operation 9.

Figure 5:
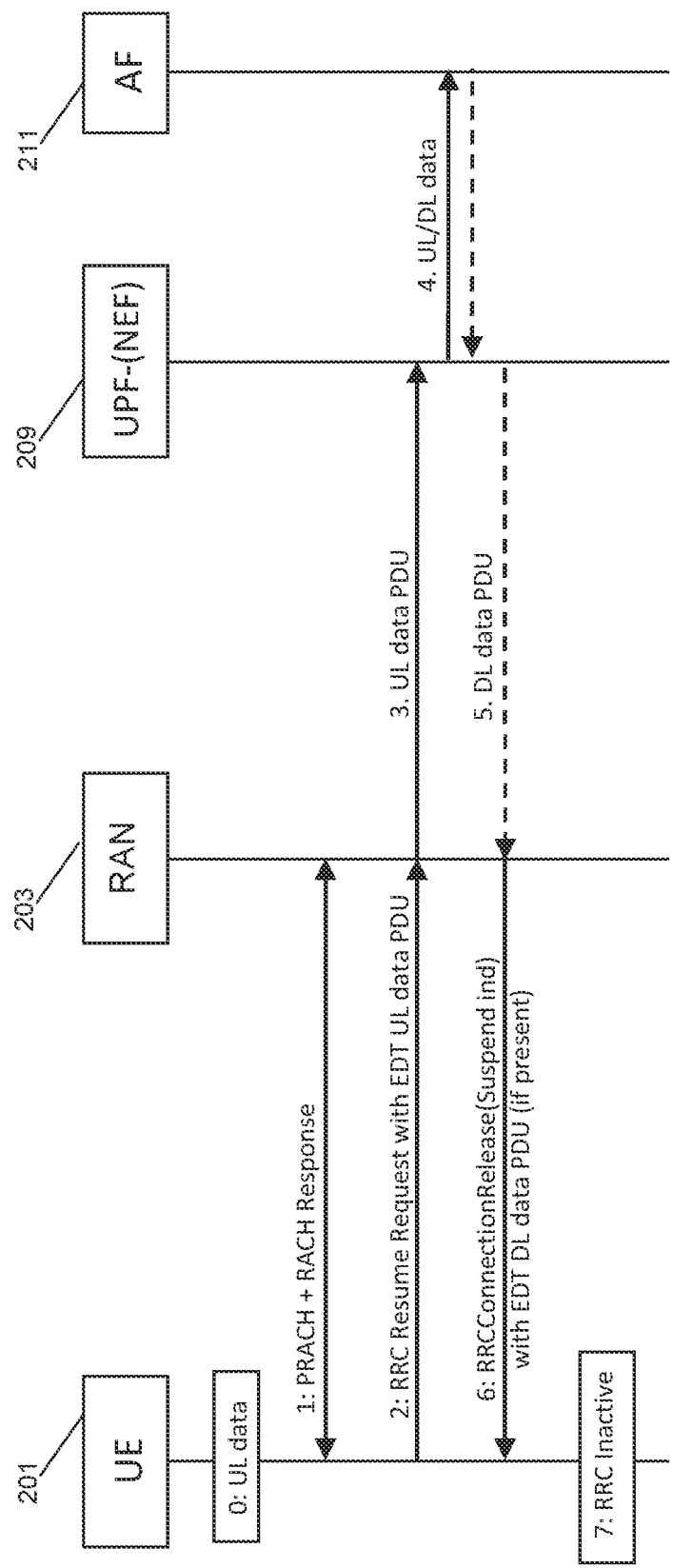
FIG. 5 is a message diagram illustrating operations for uplink and downlink data according to some embodiments of inventive concepts.

FIG. 5 is a message diagram illustrating mobile originated MO transmission with Early Data Transmission and RRC Inactive. An efficient data transmission can be achieved for one of the most frequent small data transmission scenarios, i.e., one UL message (acknowledged or unacknowledged). Acknowledgements, if used, are often generated by a protocol layer such as a Small data transmission function. The Small data transmission function is assumed to be dimensioned for low latency response of small data communications, allowing the potential acknowledgement to be included as Early Data Transmission in the RRC Command message. This may enable low delay communication and reduced UE power consumption with reduced/minimum signalling.

The UPF-(NEF) entity 209 (also referred to as a UPF node or UPF-(NEF) node) in FIG. 5 may be the UPF-NEF (i.e. Small data delivery function) in the Indirect Model case (i.e., when NIDD API is used) and it is a UPF in the Direct Model case. Note that EDT has been agreed in RAN for R15. Work with EDT in R16 will be started.

Operation 0.

Wireless device UE 201 decides to send a small data sensor value to the SCS/AS.

Operation 1.

Wireless device UE 201 is in RRC Inactive and before the UL data PDU can be transmitted, and a resume of the radio connection is invoked. Operations of FIG. 5 may be provided as part of a random access procedure. While not shown separately in operation 1 of FIG. 5, wireless device UE 201 may initiate the random access procedure by transmitting a random access preamble message (msg1 or PRACH) of the random access procedure to radio access network RAN node 203, and RAN node 203 may respond by transmitting a random access response message (msg2 or RACH Response) of the random access procedure to wireless device UE 201, as indicated at Operation 1. As used herein, RAN node 203 may also be referred to as NG-RAN.

Operation 2.

The UL data PDU is included as Early Data Transmission with the RRC Resume Request message transmitted from wireless device UE 201 to RAN node 203, preferably after having left Idle mode or Idle state or similar (but not necessarily having entered fully connected state).

Operation 3.

RAN node 203 finds the UE context using the Resume ID and forwards the UL data PDU on the N3 interface to the UPF node 209.

If an AS RAI (included by the UE 201 in the RRC Connection Resume Request of operation 2) indicates single packet transmission, or if the Expected UE Behaviour stored in the UE context in RAN indicates single packet and the AS RAI is not present, then RAN, for increased/maximum UE power efficiency, may immediately releases the RRC connection (with a suspend indication and without any EDT DL data) by transmitting the RRC Connection release message of Operation 6 without DL data. In this case, operation 5 will not occur, and the RRC connection release message (with suspend indication) may be transmitted immediately after receiving the RRC resume request message of operation 202 without waiting for any RAN specific timeout.

If AS RAI indicates multiple packets, or if the Expected UE Behaviour stored in the UE context in RAN indicates multiple packets and the AS RAI is not present, then RAN may accept the resume request and may send an RRC Connection Resume to the UE to allow multiple UL & DL packets to be conveyed.

Operation 4.

For the Direct Model case, the UPF node 209 forwards data to/from the AF node 211 (i.e. SCS/AS). For the Indirect Model case, this operation may be the NIDD API. See for example the UPF-NEF solution 35.

Operation 5.

The receiver (AF node 211) may respond with a DL data PDU (e.g., an acknowledgement), and UPF node 209 may forward/transmit the DL data PDU to RAN node 203.

Operation 6.

If RAN node 203 receives the DL data PDU before the RRC response timer expires in the RAN and the AS RAI indicates dual packets or if the Expected UE Behaviour stored in the UE context in RAN indicates dual packets and the AS RAI is not present, then RAN node 203 expects no further data and includes the DL data PDU as Early Data Transmission with a RRC Connection Release message with suspend indication sent to wireless device UE 201.

If the RRC response timer expires without any received DL data and RAN expects further data (i.e., AS RAI indicated dual or multiple packets, or if the Expected UE Behaviour stored in the UE context in RAN indicates dual or multiple packets and the AS RAI was not present), then RAN node 203 may send a RRC Connection Resume to the UE to allow DL data that may have been delayed.

If AS RAI indicated multiple packets, or if the Expected UE Behaviour stored in the UE context in RAN indicates multiple packets and the AS RAI was not present, then RAN node 203 may determine that further packets can be expected and instead move the UE to RRC_CONNECED state by sending an RRC Connection Resume to the UE. Normal inactivity may in that case trigger RRC Connection Release with suspend indication.

Operation 7.

Wireless device UE 201 enters RRC Inactive mode.

Figure 6:
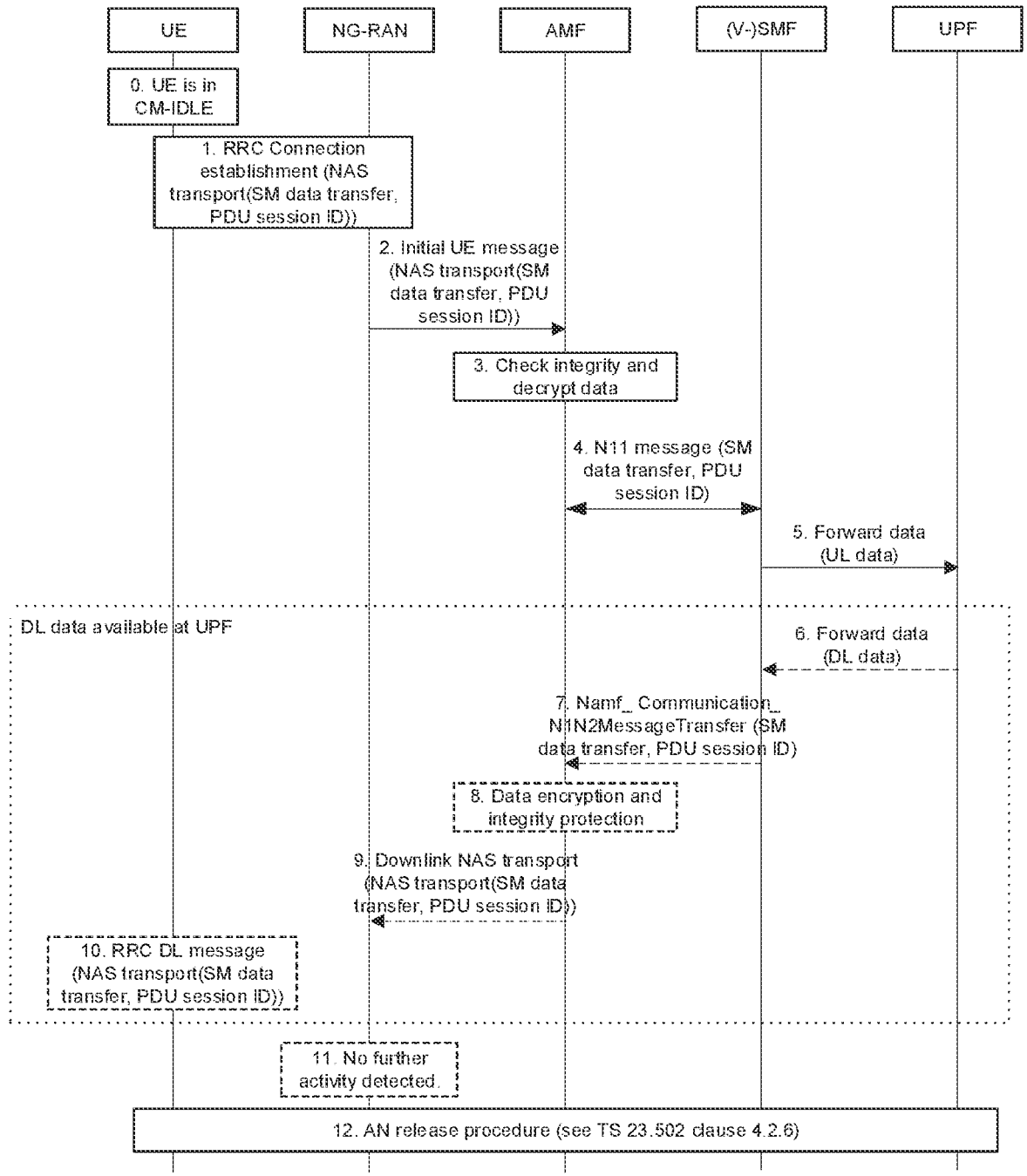
FIG. 6 is a message diagram illustrating operations of data transport using NAS-SM and N6 according to some embodiments of inventive concepts.

Further embodiments are discussed with respect to the message diagram of FIG. 6 where a DoNAS based method/flow is illustrated/discussed. However, innovative operations/logic, that the AMF node can based on Expected UE behavior to indicate to RAN if UE connection shall be released, can be applied to a scenario when a user plane based method is used to deliver data. FIG. 6 illustrates mobile originated data transport via NAS-SM and N6.

Operation 0.

Wireless device UE is in CM-IDLE.

Operation 1.

Wireless device UE establishes an RRC connection and sends a NAS PDU as part of this. The NAS PDU carries encrypted uplink data as payload of an SM data transfer message and a PDU session ID.

Operation 2.

NG-RAN node forwards the NAS PDU to the AMF node. Wireless device UE can also provide RAI indication in the NAS to AMF node.

Operation 3.

AMF node checks the integrity of the incoming NAS PDU and decrypts the data it contains.

Operation 4.

AMF node forwards the data to the (V-)SMF node handling the PDU session identified by the PDU session ID contained in the NAS transport message.

Note that whether a new or an existing service operation of SMF should be invoked in this operation may be for future study FFS.

If RAI (e.g., at NAS level) indicates single packet, or if the Expected UE Behaviour stored in the UE context in AMF or SMF indicates single packet, then AMF continues directly to operation 9 and instructing RAN node to release the connection with wireless device UE.

Operation 5.

The (V-)SMF node decompresses the header if header compression applies to the PDU session. The V-SMF node forwards the data to the UPF node. (In the home-routed roaming case, the UPF node may forward the data to a different UPF node in the HPLMN via N9.) The UPF node forwards the data to the DN. In case of unstructured data, tunneling may be applied according to clause 5.6.10.3 in TS 23.501 [5].

Operation 6.

[Conditional] The UPF node forwards available downlink data to the (V-)SMF node.

Operation 7.

[Conditional] The (V-)SMF node compresses the header if header compression applies to the PDU session and encapsulates the downlink data as payload in an SM data transfer message. The (V-)SMF node forwards the SM data transfer message and the PDU session ID to the AMF node using the Namf_Communication_N1N2MessageTransfer service operation.

Operation 8.

[Conditional] The AMF node creates a DL NAS transport message with the received PDU session ID and the SM data transfer message (container type is set to SM data transfer). The AMF node ciphers and integrity protects the NAS transport message If RAI in operation 2 indicated dual or multiple packets, or if the Expected UE Behaviour stored in the UE context in CN indicates dual packets, then AMF node continues in operation 9 and instructs RAN node to release the connection with wireless device UE.

Operation 9.

[Conditional] The AMF node sends the DL NAS transport message to NG-RAN node. The AMF node may also optionally indicate if connection with wireless device UE shall be released immediately Operation 10.

[Conditional] NG-RAN node delivers the NAS payload over RRC to the wireless device UE.

Operation 11.

[Conditional] If no further NAS PDU activity is detected by NG-RAN node based on inactivity timer, then NG-RAN node triggers the AN release procedure. If indication from AMF node is received in operation 9, NG-RAN node may release the wireless device UE connection immediately.

Operation 12.

The wireless device UE's logical NG-AP signaling connection and RRC signaling connection are released as per TS 23.502 [7] clause 4.2.6.

Note that how the UE is released based on Release Assistance Information is discussed, for example, in TR 23.724 v0.5.0, clause 6.1.2.

The exact NGAP messages to be used for operations of FIG. 6 are expected to be discussed with RAN3.

According to some embodiments disclosed herein, methods may be provided to immediately suspend or release an RRC Connection after a single UL packet transmission or dual (UL+DL) packet transmission based on information available in the network. Such operations may significantly reduce wireless device UE power consumption, which may be especially useful/important for battery operated devices. According to some embodiments Early Data Transmission (EDT) may be provided together with the 5G UP Optimization (clause 6.19.4.2b "Single MO data Transmission using 5GS UP Optimization and EDT" above). An immediate RRC suspend may also be provided as part of this EDT procedure.

Note that in EDT, a single UL packet (and optionally also a single DL packet) can be passed as part of the RRC Connection establishment procedure messages instead of using separate messages over the radio (e.g., instead of using separate messages over a separate Data Radio Bearer (DRB) when UP data is used).

Operations of RAN node 203 will now be discussed with reference to the flow chart of FIG. 9 and the message diagram of FIG. 2. For example, modules may be stored in RAN node memory 5005 of FIG. 8, and these modules may provide instructions so that when the instructions of a module are executed by processor 5003, processor 5003 performs respective operations of the flow chart of FIG. 9.

At block 901, processor 5003 may receive a random access preamble message from wireless terminal 201 (through transceiver 5001) for a random access procedure. At block 903, processor 5003 may transmit a random access response message through transceiver 5001 to wireless terminal 201 for the random access procedure responsive to receiving the random access preamble message from the wireless terminal. At block 905, processor 5003 may receive a connection resume request message (e.g., a Radio Resource Control RRC connection resume request message) from the wireless terminal (through transceiver 5001) instructing the RAN node to establish a connection with wireless terminal 201. The connection resume request message may be a connection resume request of the random access procedure that is received after transmitting the random access response. The connection resume request message may be received as discussed above with respect to the RRC Resume Request of operation 1a of FIG. 2. At block 907, processor 5003 may provide release information for wireless terminal 201 at RAN node 203. The release information may be provided as discussed above with respect to operation 1a and/or the context fetch of FIG. 2. According to some embodiments, providing the release information may include receiving a single packet indication from wireless terminal 201 with the connection resume request message. According to some other embodiments, providing the release information may include obtaining the release information from a core network node of the wireless communication network. According to still other embodiments, the release information may include information to release a Radio Resource Control RRC connection based on at least one of a traffic pattern, a traffic profile, release assistance information, and/or a release assistance indicator. At block 909, processor 5003 may transmit a connection resume response message (e.g., a Radio Resource Control RRC resume message) through transceiver 5001 to wireless terminal 201 in response to receiving the connection resume request message. The connection resume response message may be transmitted as discussed above with respect to the RRC Resume Response of operation 1b of FIG. 2. At block 911, processor 5003 may receive uplink data from wireless terminal 201 (through transceiver 5001) after providing the release information for wireless terminal 201 at RAN node 203, with the uplink data being associated with the connection resume request message. The uplink data may be received as discussed above with respect to operation 1c of FIG. 2. The uplink data may be received after transmitting the connection resume response message. At block 913, processor 5003 may transmit a connection release message (e.g., a Radio Resource Control RRC connection release message with a suspend indication) through transceiver 5001 to wireless terminal 201 after receiving the uplink data responsive to the release information for the wireless terminal, wherein the connection release message instructs the wireless terminal to release and/or suspend the connection. The connection release message may be transmitted as discussed above with respect to the RRC Connection Release (with suspend indication) of operation 1d of FIG. 2. Moreover, the connection release message may be transmitted responsive to the release information without waiting for expiration of any timer after receiving the uplink data. According embodiments where the release information includes a single packet indication, processor 5003 may transmit the connection release message responsive to the single packet indication.

Figure 9:
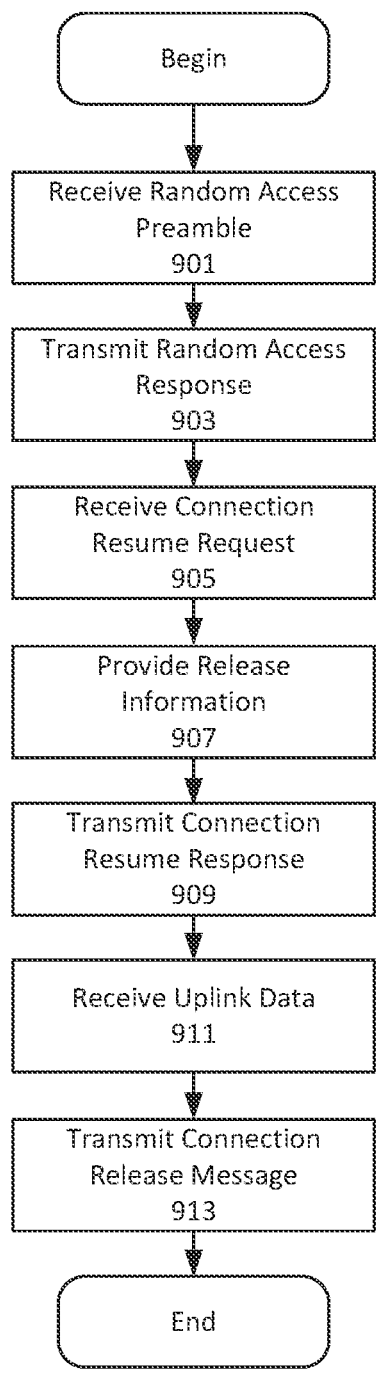
FIGS. 9-12 are flow charts illustrating operations of a RAN node according to some embodiments of inventive concepts.

Various operations from the flow chart of FIG. 9 may be optional with respect to some embodiments of base stations and related methods. Regarding methods of example embodiment 1 (set forth below), for example, operations of blocks 901, 903, and 909 of FIG. 9 may be optional.

Operations of RAN node 203 will now be discussed with reference to the flow chart of FIG. 10 and the message diagram of FIG. 3. For example, modules may be stored in base station memory 5005 of FIG. 8, and these modules may provide instructions so that when the instructions of a module are executed by processor 5003, processor 5003 performs respective operations of the flow chart of FIG. 10.

At block 901, processor 5003 may receive a random access preamble message from wireless terminal 201 (through transceiver 5001) for a random access procedure. At block 903, processor 5003 may transmit a random access response message through transceiver 5001 to wireless terminal 201 for the random access procedure responsive to receiving the random access preamble message from the wireless terminal. At block 1005, processor 5003 may receive a connection resume request message (e.g., a Radio Resource Control RRC connection resume request message) from the wireless terminal (through transceiver 5001) instructing RAN node 203 to establish a connection with wireless terminal 201, and the connection resume request message may also include uplink data (associated with the connection resume request message) from wireless terminal 201. Such uplink data may be included as a parameter of the resume request message and/or as a parameter in a protocol layer used to convey the resume request message. Moreover, the connection resume request message may be a connection resume request of the random access procedure that is received after transmitting the random access response. For example, the connection resume request message may be received as discussed above with respect to operation 1a of FIG. 3. At block 1007, processor 5003 may provide release information for wireless terminal 201 at the RAN node.

According to some embodiments, the release information may be received with/in the connection resume request message of block 1005. Uplink data in the connection resume request message of block 1005 may thus be received with the release information in the connection resume request message. For example, providing the release information may include receiving a single packet indication from wireless terminal 201 in the connection resume request message. Moreover, the connection resume request message may include an early data transmission EDT indication. According to some other embodiments, providing the release information may include obtaining the release information from a core network node of the wireless communication network. According to still other embodiments, the release information may include information to release a Radio Resource Control RRC connection based on at least one of a traffic pattern, a traffic profile, release assistance information, and/or a release assistance indicator.

At block 1013, processor 5003 may transmit a connection release message (e.g., a Radio Resource Control RRC connection release message with a suspend indication) through transceiver 5001 to wireless terminal 201 after receiving the uplink data responsive to the release information for the wireless terminal, wherein the connection release instructs the wireless terminal to release and/or suspend the connection. According to embodiments where the release information includes a single packet indication, the connection release message may be transmitted responsive to the single packet indication. For example, the connection release message may be transmitted as discussed above with respect to operation 1b of FIG. 3.

According to some embodiments, the connection release message may include downlink data for wireless terminal 201. Such downlink data may be included as a parameter of the connection release message and/or as a parameter in a protocol layer used to convey the connection release message.

Figure 10:
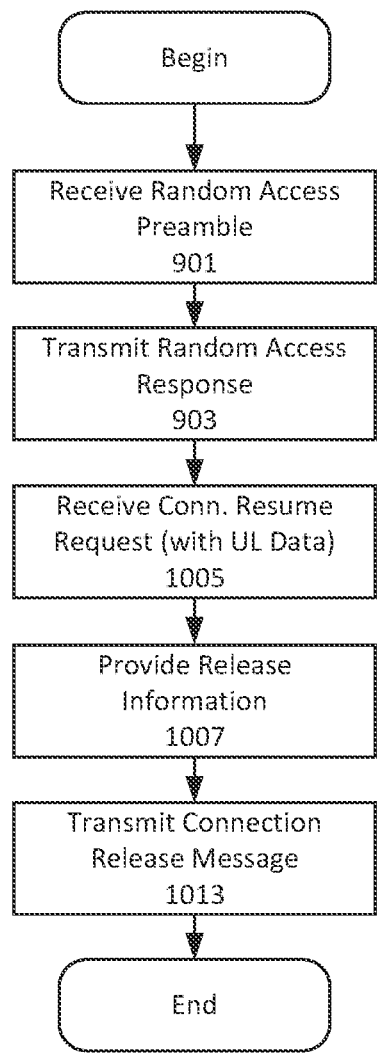

Various operations from the flow chart of FIG. 10 may be optional with respect to some embodiments of base stations and related methods. Regarding methods of example embodiment 1 (set forth below), for example, operations of blocks 901 and 903 of FIG. 10 may be optional.

Operations of RAN node 203 will now be discussed with reference to the flow chart of FIG. 11 and the message diagram of FIG. 4. For example, modules may be stored in base station memory 5005 of FIG. 8, and these modules may provide instructions so that when the instructions of a module are executed by processor 5003, processor 5003 performs respective operations of the flow chart of FIG. 11.

At block 901, processor 5003 may receive a random access preamble message from wireless terminal 201 (through transceiver 5001) for a random access procedure. At block 903, processor 5003 may transmit a random access response message through transceiver 5001 to wireless terminal 201 for the random access procedure responsive to receiving the random access preamble message from the wireless terminal. At block 1105, processor 5003 may receive a connection resume request message (e.g., a Radio Resource Control RRC connection resume request message) from wireless terminal 201 (through transceiver 5001) instructing RAN node 203 to establish a connection with wireless terminal 201. The connection resume request message may be a connection resume request of the random access procedure that is received after transmitting the random access response. For example, the connection resume request message may be received as discussed above with respect to operation 2 of FIG. 4. At block 1107, processor 5003 may provide release information for wireless terminal 201 at the RAN node. According to some embodiments, providing the release information may include receiving a dual packet indication from wireless terminal 201, and the dual packet indication may be received with the connection resume request message. According to some other embodiments, providing the release information may include obtaining the release information from a core network node of the wireless communication network. According to some other embodiments, the release information may include information to release a Radio Resource Control RRC connection based on at least one of a traffic pattern, a traffic profile, release assistance information, and/or a release assistance indicator. At block 1109, processor 5003 may transmit a connection resume response message (e.g., a Radio Resource Control RRC connection resume message) through transceiver 5001 to wireless terminal 201 in response to receiving the connection resume request message. For example, the connection resume response message may be transmitted as discussed above with respect to operation 3 of FIG. 4. At block 1111, processor 5003 may receive uplink data from wireless terminal 201 (through transceiver 5001) after transmitting the connection resume response message and/or after providing the release information for wireless terminal 201 at the RAN node. Moreover, the uplink data may be associated with the connection resume request message. For example, the uplink data may be received as discussed above with respect to operation 4 of FIG. 4. At block 1112, processor 5003 may transmit downlink data through transceiver 5001 to wireless terminal 201 after receiving the uplink data. For example, the downlink data may be transmitted as discussed above with respect to operation 8 of FIG. 4. At block 1113, processor 5003 may transmit a connection release message (e.g., a Radio Resource Control RRC connection release message with a suspend indication) to wireless terminal 201 after receiving the uplink data responsive to the release information for the wireless terminal. The connection release may instruct the wireless terminal to release and/or suspend the connection, and the connection release message may be transmitted after transmitting the downlink data responsive to the release information for wireless terminal 201. The connection release message may be transmitted responsive to the release information without waiting for expiration of any timer after transmitting the downlink data. If the release information is a dual packet indication, the connection release message may be transmitted responsive to the dual packet indication. For example, the connection release message may be transmitted as discussed above with respect to operation 9 of FIG. 4.

Figure 11:
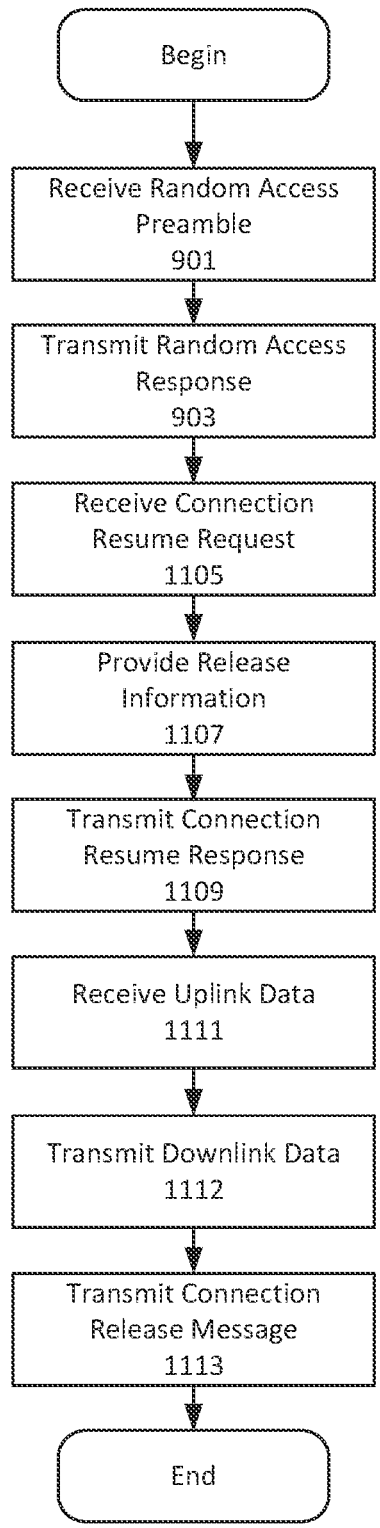

Various operations from the flow chart of FIG. 11 may be optional with respect to some embodiments of base stations and related methods. Regarding methods of example embodiment 1 (set forth below), for example, operations of blocks 901, 903, 1109, and 1112 of FIG. 11 may be optional.

Operations of RAN node 203 will now be discussed with reference to the flow chart of FIG. 12 and the message diagram of FIG. 5. For example, modules may be stored in base station memory 5005 of FIG. 8, and these modules may provide instructions so that when the instructions of a module are executed by processor 5003, processor 5003 performs respective operations of the flow chart of FIG. 12.

At block 901, processor 5003 may receive a random access preamble message from wireless terminal 201 (through transceiver 5001) for a random access procedure. At block 903, processor 5003 may transmit a random access response message through transceiver 5001 to wireless terminal 201 for the random access procedure responsive to receiving the random access preamble message from the wireless terminal. At block 1205, processor 5003 may receive a connection resume request message (e.g., a Radio Resource Control RRC connection resume request message) from the wireless terminal 201 (through transceiver 5001) instructing the RAN node to establish a connection with wireless terminal 201. The connection resume request message may also include an early data transmission indication and uplink data from wireless terminal 201. Moreover, the connection resume request message may be a connection resume request message of the random access procedure that is received after transmitting the random access response. For example, the connection resume request message may be received as discussed above with respect to operation 2 of FIG. 5. At block 1207, processor 5003 may provide release information for wireless terminal 201 at RAN node 203. Providing the release information may include receiving a dual packet indication from wireless terminal 201 with the connection resume request message. According to some other embodiments, providing the release information may include obtaining the release information from a core network node of the wireless communication network. According to some other embodiments, the release information may include information to release a Radio Resource Control RRC connection based on at least one of a traffic pattern, a traffic profile, release assistance information, and/or a release assistance indicator. At block 1213, processor 1213 may transmit a connection release message (e.g., a Radio Resource Control RRC connection release message with a suspend indication) through transceiver 5001 to wireless terminal 201 after receiving the uplink data responsive to the release information for the wireless terminal. The connection release message instructs wireless terminal 201 to release and/or suspend the connection, and the connection release message may also include downlink data. Moreover, the downlink data may be included as a parameter of the connection release message and/or as a parameter in a protocol layer used to convey the connection release message. If the release information includes a dual packet indication, the connection release message may be transmitted responsive to the dual packet indication. For example, the connection release message may be transmitted as discussed above with respect to operation 6 of FIG. 5.

Figure 12:
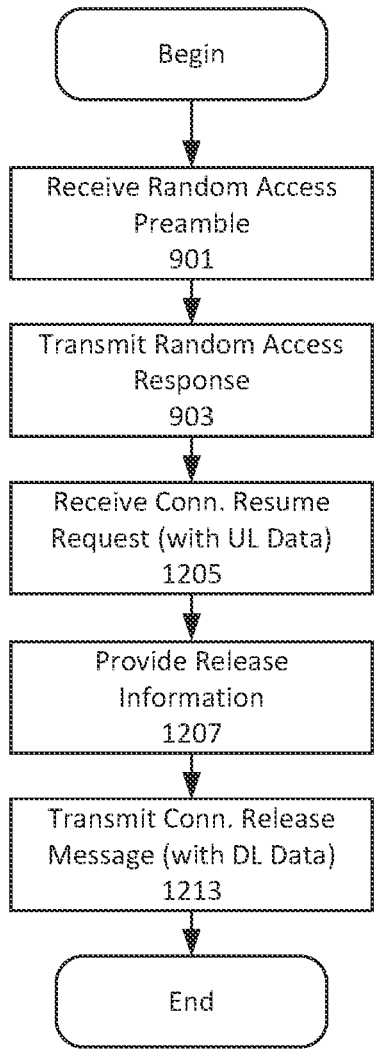

Various operations from the flow chart of FIG. 12 may be optional with respect to some embodiments of base stations and related methods. Regarding methods of example embodiment 1 (set forth below), for example, operations of blocks 901 and 903 of FIG. 12 may be optional.

Some of the example embodiments described above may be summarized as in the following itemized summary:

ITEMIZED SUMMARY

Item 1. A method of operating a radio access network, RAN, node (203) of a wireless communication network, the method comprising:

receiving (905, 1005, 1105, 1205) a connection resume request message from a wireless terminal (201) at the RAN node instructing the RAN node to establish a connection with the wireless terminal;

providing (907, 1007, 1107, 1207) release information for the wireless terminal at the RAN node;

receiving (911, 1005, 1111, 1205) uplink data from the wireless terminal at the RAN node, wherein the uplink data is associated with the connection resume request message; and transmitting (913, 1013, 1113, 1213) a connection release message to the wireless terminal after receiving the uplink data responsive to the release information for the wireless terminal, wherein the connection release message instructs the wireless terminal to release and/or suspend the connection.

Item 2. The method of Item 1, wherein the connection release message is transmitted responsive to the release information without waiting for expiration of any timer after receiving the uplink data.

Item 3. The method of any of Items 1-2 further comprising:
transmitting (909) a connection resume response message to the wireless terminal in response to receiving the connection resume request message;
wherein the uplink data is received after transmitting the connection resume response message.

Item 4. The method of Item 3, wherein the connection resume response message is a Radio Resource Control, RRC, resume message.

Item 5. The method of any of Items 3-4, wherein providing the release information comprises receiving a single packet indication from the wireless terminal, and wherein transmitting the connection release message comprises transmitting the connection release message responsive to the single packet indication.

Item 6. The method of Item 5, wherein the single packet indication is received with the connection resume request message.

Item 7. The method of any of Items 1-2, wherein the uplink data is included with the connection resume request message.

Item 8. The method of Item 7, wherein the connection resume request message includes an early data transmission indication.

Item 9. The method of any of Items 7-8, wherein providing the release information comprises receiving a single packet indication from the wireless terminal, and wherein transmitting the connection release message comprises transmitting the connection release message responsive to the single packet indication.

Item 10. The method of Item 9, wherein the single packet indication is received with the connection resume request message.

Item 11. The method of any of any of Items 7-8, wherein the connection release message includes downlink data for the wireless terminal.

Item 12. The method of Item 11, wherein the downlink data is included as a parameter of the connection release message and/or as a parameter in a protocol layer used to convey the connection release message.

Item 13. The method of any of Items 7-12, wherein the uplink data is included as a parameter of the resume request message and/or as a parameter in a protocol layer used to convey the resume request message.

Item 14. The method of any of Items 1-2 further comprising:
transmitting (1112) downlink data to the wireless terminal after receiving the uplink data;
wherein the connection release message is transmitted after transmitting the downlink data responsive to the release information for the wireless terminal.

Item 15. The method of Item 14, wherein the connection release message is transmitted responsive to the release information without waiting for expiration of any timer after transmitting the downlink data.

Item 16. The method of any of Items 14-15, wherein providing the release information comprises receiving a dual packet indication from the wireless terminal, and wherein transmitting the connection release message comprises transmitting the connection release message responsive to the dual packet indication.

Item 17. The method of Item 16, wherein the dual packet indication is received with the connection resume request message.

Item 18. The method of any of Items 1-2, wherein downlink data is included with the connection release message.

Item 19. The method of Item 18, wherein the connection resume request message includes an early data transmission indication.

Item 20. The method of any of Items 18-19, wherein the wherein the uplink data is included in the connection resume request message.

Item 21. The method of any of Items 18-20, wherein providing the release information comprises receiving a dual packet indication from the wireless terminal, and wherein transmitting the connection release message comprises transmitting the connection release message responsive to the dual packet indication.

Item 22. The method of Item 21, wherein the dual packet indication is received with the connection resume request message.

Item 23. The method of any of Items 18-22, wherein the downlink data is included as a parameter of the connection release message and/or as a parameter in a protocol layer used to convey the connection release message.

Item 24. The method of any of Items 1-23 further comprising:
receiving (901) a random access preamble message from the wireless terminal for a random access procedure; and
transmitting (903) a random access response message to the wireless terminal for the random access procedure responsive to receiving the random access preamble message from the wireless terminal;
wherein the connection resume request message is a connection resume request message of the random access procedure that is received after transmitting the random access response.

Item 25. The method of any of Items 1-24, wherein the connection resume request message is a Radio Resource Control, RRC, connection resume request message.

Item 26. The method of any of Items 1-25, wherein the connection release message comprises a Radio Resource Control, RRC, connection release message.

Item 27. The method of Item 26, wherein the RRC connection release message includes a suspend indication.

Item 28. The method of any of Items 1-27, wherein providing the release information comprises obtaining the release information from a core network node of the wireless communication network.

Item 29. The method of any of Items 1-28, wherein the release information comprises information to release a Radio Resource Control, RRC, connection based on at least one of a traffic pattern, a traffic profile, release assistance information, and/or a release assistance indicator.

Item 30. The method of any of Items 1-29, wherein the uplink data is received from the wireless terminal at the RAN node after providing the release information for the wireless terminal at the RAN node.

Item 31. A Radio Access Network, RAN, node (203) of a wireless communication network, wherein the RAN node is adapted to perform according to any of Items 1-30.

Item 32. A Radio Access Network, RAN, node (203) of a wireless communication network, the RAN node comprising:
a processor (5003); and
memory (5005) coupled with the processor, wherein the memory includes instructions that when executed by the processor causes the RAN node to perform operations according to any of Items 1-30.

Item 33. A computer program product, comprising:
a non-transitory computer readable storage medium comprising computer readable program code embodied in the medium that when executed by a processor (5003) of a radio access network, RAN, node (203) causes the RAN node to perform operations according to any of Items 1-30.

Explanations for abbreviations from the above disclosure are provided below.

| Abbreviation | Explanation |
| --- | --- |
| AMF | Access and Mobility Function |
| AS | Application Server |
| AS | Access Stratum |
| SCS | Service Capability Server (a type of AS defined in TS 23.682, Reference [5]) |
| CIoT | Cellular Internet of Things |
| EDT | Early Data Transmission (to "piggy back" user data in the RRC connection establishment signalling) |
| IoT | Internet of Things |
| RRC | Radio Resource Control |
| DL | Down Link |
| UL | Up Link |
| MO | Mobile Originated |
| MT | Mobile Terminated |
| NG | New Radio |
| RAI | Release Assistance Information/Indication/Indicator |
| RAN | Radio Access Network |
| RRC | Radio Resource Control |
| UE | User Equipment i.e. "device" or "wireless device" |
| UP | User Plane |
| CP | Control Plane |

Citations for references from the above disclosure are provided below.

Reference [1]: 3GPP TR 23.724 V0.5.0 (2018-07), Technical Specification Group Services and System Aspects; Study on Cellular IoT support and evolution for the 5G System (Release 16)

Reference [2]: 3GPP TR 38.804 V14.0.0 (2017-03), Technical Specification Group Radio Access Network; Study on New Radio Access Technology; Radio Interface Protocol Aspects (Release 14)

Reference [3]: 3GPP TS 23.501 V15.2.0 (2018-06), Technical Specification Group Services and System Aspects; System Architecture for the 5G System; Stage 2 (Release 15)

Reference [4]: 3GPP TS 23.502 V15.2.0 (2018-06), Technical Specification Group Services and System Aspects; Procedures for the 5G System; Stage 2 (Release 15)

Reference [5]: 3GPP TS 23.682 V15.5.0 (2018-06), Technical Specification Group Services and System Aspects; Architecture enhancements to facilitate communications with packet data networks and applications (Release 15)

Reference [6]: 3GPP TR 38.804 V14.0.0 (2017-03), Technical Specification Group Radio Access Network; Study on New Radio Access Technology; Radio Interface Protocol Aspects (Release 14)

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating a radio access network, RAN, node of a wireless communication network, the method comprising:
receiving a Radio Resource Control, RRC, connection resume request message from a wireless terminal at the RAN node instructing the RAN node to establish a connection with the wireless terminal, wherein uplink data is associated with the RRC connection resume request message;
obtaining release information for the wireless terminal at the RAN node, wherein the release information comprises information to release a RRC connection based on release assistance information; and
responsive to the release information and without waiting for expiration of any timer after receiving the uplink data, transmitting a RRC connection release message to the wireless terminal after receiving the uplink data based on the release information for the wireless terminal, wherein the RRC connection release message comprises a suspend indication that instructs the wireless terminal to suspend the connection.

2. The method of claim 1 further comprising:
transmitting a RRC connection resume response message to the wireless terminal in response to receiving the RRC connection resume request message;
wherein the uplink data is received after transmitting the connection resume response message.

3. The method of claim 2, wherein obtaining the release information comprises receiving a single packet indication from the wireless terminal, and wherein transmitting the RRC connection release message comprises transmitting the RRC connection release message responsive to the single packet indication.

4. The method of claim 3, wherein the single packet indication is received with the RRC connection resume request message.

5. The method of claim 1, wherein the RRC connection resume request message includes an early data transmission indication.

6. The method of claim 1, wherein providing the release information comprises receiving a single packet indication from the wireless terminal, and wherein transmitting the RRC connection release message comprises transmitting the RRC connection release message responsive to the single packet indication.

7. The method of claim 1, wherein the RRC connection release message includes downlink data for the wireless terminal.

8. The method of claim 7, wherein the downlink data is included as at least one of a parameter of the RRC connection release message and a parameter in a protocol layer used to convey the RRC connection release message.

9. The method of claim 1, wherein the uplink data is included as a parameter of the RRC connection resume request message and/or as a parameter in a protocol layer used to convey the RRC resume request message.

10. The method of claim 1 further comprising:
transmitting downlink data to the wireless terminal after receiving the uplink data;
wherein the RRC connection release message is transmitted after transmitting the downlink data responsive to the release information for the wireless terminal.

11. The method of claim 10, wherein the RRC connection release message is transmitted responsive to the release information without waiting for expiration of any timer after transmitting the downlink data.

12. The method of claim 10, wherein providing the release information comprises receiving a dual packet indication from the wireless terminal, and wherein transmitting the RRC connection release message comprises transmitting the RRC connection release message responsive to the dual packet indication.

13. The method of claim 1, wherein downlink data is included with the RRC connection release message.

14. The method of claim 13, wherein the RRC connection resume request message includes an early data transmission indication.

15. The method of claim 13, wherein the wherein the uplink data is included in the RRC connection resume request message.

16. The method of claim 13, wherein providing the release information comprises receiving a dual packet indication from the wireless terminal, and wherein transmitting the RRC connection release message comprises transmitting the RRC connection release message responsive to the dual packet indication.

17. The method of claim 16, wherein the dual packet indication is received with the RRC connection resume request message.

18. The method of claim 13, wherein the downlink data is included as at least one of a parameter of the RRC connection release message and a parameter in a protocol layer used to convey the RRC connection release message.

19. The method of claim 1 further comprising:
receiving a random access preamble message from the wireless terminal for a random access procedure; and
transmitting a random access response message to the wireless terminal for the random access procedure responsive to receiving the random access preamble message from the wireless terminal;
wherein the RRC connection resume request message is a RRC connection resume request message of the random access procedure that is received after transmitting the random access response.

20. The method of claim 1, wherein obtaining the release information comprises obtaining the release information from a core network node of the wireless communication network.

21. The method of claim 1, wherein the uplink data is received from the wireless terminal at the RAN node after providing the release information for the wireless terminal at the RAN node.

22. A Radio Access Network, RAN, node of a wireless communication network, the RAN node comprising:
a processor; and
memory coupled with the processor, wherein the memory includes instructions that when executed by the processor causes the RAN node to perform operations comprising:
receiving a Radio Resource Control, RRC, connection resume request message from a wireless terminal at the RAN node instructing the RAN node to establish a connection with the wireless terminal, wherein uplink data is associated with the RRC connection resume request message;
obtaining release information for the wireless terminal at the RAN node, wherein the release information comprises information to release a RRC connection based on release assistance information; and
responsive to the release information and without waiting for expiration of any timer after receiving the uplink data, transmitting a RRC connection release message to the wireless terminal after receiving the uplink data based on the release information for the wireless terminal, wherein the RRC connection release message comprises a suspend indication that instructs the wireless terminal to suspend the connection.

23. A method of operating a radio access network, RAN, node of a wireless communication network, the method comprising:
receiving a Radio Resource Control, RRC, connection resume request message from a wireless terminal at the RAN node instructing the RAN node to establish a connection with the wireless terminal, wherein uplink data is included with the RRC connection resume request message;
obtaining release information for the wireless terminal at the RAN node, wherein the release information comprises information to release a RRC connection based on at least one of a traffic pattern, a traffic profile, and/or a release assistance indicator; and
transmitting a RRC connection release message to the wireless terminal after receiving the uplink data based on the release information for the wireless terminal, wherein the RRC connection release message comprises a suspend indication that indicates that the RRC connection resume request message is not progressed and that instructs the wireless terminal to suspend the connection, wherein the RRC connection release message is transmitted responsive to the release information without waiting for expiration of any timer after receiving the uplink data.

* * * * *

UNITED STATES PATENT AND TRADEMARK OFFICE
CERTIFICATE OF CORRECTION

PATENT NO. : 12,245,323 B2
APPLICATION NO. : 17/265130
DATED : March 4, 2025
INVENTOR(S) : Rönneke et al.

Page 1 of 1

It is certified that error appears in the above-identified patent and that said Letters Patent is hereby corrected as shown below:

In the Specification

In Column 1, Line 34, delete "Mobility" and insert -- Mobility Management --, therefor.

In Column 5, Line 8, delete "mobility" and insert -- mobility management --, therefor.

In Column 21, Line 14, delete "Access and Mobility Function" and insert -- Access and Mobility Management Function --, therefor.

Signed and Sealed this
Twenty-third Day of December, 2025

John A. Squires
*Director of the United States Patent and Trademark Office*